(12) United States Patent
Shi

(10) Patent No.: US 9,956,642 B2
(45) Date of Patent: May 1, 2018

(54) COPPER AND STEEL COMPOSITE PIPE, MANUFACTURING METHOD, APPLICATION AND WELDED STRUCTURE BODY

(71) Applicant: Zhuji Sibeida Machinery Co., Ltd., Zhuji, Zhejiang Province (CN)

(72) Inventor: Yongbo Shi, Zhejiang Province (CN)

(73) Assignee: Zhuji Sibeida Machinery Co., Ltd., Zhuji, Zhejiang Province (CN)

( * ) Notice: Subject to any disclaimer, the term of this patent is extended or adjusted under 35 U.S.C. 154(b) by 227 days.

(21) Appl. No.: 14/815,397

(22) Filed: Jul. 31, 2015

(65) Prior Publication Data
US 2016/0312923 A1    Oct. 27, 2016

(30) Foreign Application Priority Data

Apr. 24, 2015    (CN) .......................... 2015 1 0200942

(51) Int. Cl.
*F16L 9/02*    (2006.01)
*B23K 13/01*    (2006.01)
(Continued)

(52) U.S. Cl.
CPC .............. *B23K 13/015* (2013.01); *B23K 9/16* (2013.01); *B23K 9/232* (2013.01); *B23K 10/02* (2013.01); *B23K 11/02* (2013.01); *B23K 11/04* (2013.01); *B23K 11/20* (2013.01); *B23K 20/10* (2013.01); *B23K 20/227* (2013.01); *B23K 26/282* (2015.10); *B23K 26/323* (2015.10); *B23K 31/02* (2013.01); *F16L 13/0245* (2013.01);
(Continued)

(58) Field of Classification Search
CPC . F16L 9/02; F16L 21/00; F16L 13/007; F16L 13/02; F16L 13/0209; F16L 13/0236
USPC ............... 138/138, 139, 109; 285/294.1, 329
See application file for complete search history.

(56) References Cited

U.S. PATENT DOCUMENTS

| 5,692,088 A | * | 11/1997 | Ishiharada | ......... B29C 47/0014 385/123 |
| 2005/0006900 A1 | * | 1/2005 | Lewis | ....................... B21C 1/22 285/370 |

(Continued)

FOREIGN PATENT DOCUMENTS

| CN | 104439646 A | 3/2015 |
| CN | 204704493 U | * 10/2015 |

(Continued)

*Primary Examiner* — Patrick F Brinson
(74) *Attorney, Agent, or Firm* — Muncy, Geissler, Olds & Lowe, P.C.

(57) ABSTRACT

A novel copper and steel composite pipe, a manufacturing method, application and a welded structure body is described herein. The novel copper and steel composite pipe includes a copper pipe and a steel pipe. The steel pipe includes a first end, a second end and a middle part. The copper pipe includes a first end and a second end. The length of the copper pipe is less than that of the steel pipe. The copper pipe and the steel pipe are sleeved. The distance from an end surface of the first end of the copper pipe to an end surface of the first end of the steel pipe is less than 10 mm. The second end of the copper pipe is positioned at the middle part of the steel pipe, and the copper pipe and the steel pipe are welded and connected in a way of melting base materials.

9 Claims, 9 Drawing Sheets

(51) Int. Cl.
*B23K 31/02* (2006.01)
*B23K 11/02* (2006.01)
*F16L 13/02* (2006.01)
*B23K 9/16* (2006.01)
*B23K 9/23* (2006.01)
*B23K 10/02* (2006.01)
*B23K 11/04* (2006.01)
*B23K 11/20* (2006.01)
*B23K 20/10* (2006.01)
*B23K 20/227* (2006.01)
*B23K 26/323* (2014.01)
*B23K 26/282* (2014.01)
*B23K 101/06* (2006.01)
*B23K 101/12* (2006.01)
*B23K 103/22* (2006.01)

(52) U.S. Cl.
CPC ...... *B23K 2201/06* (2013.01); *B23K 2201/12* (2013.01); *B23K 2203/22* (2013.01)

(56) References Cited

U.S. PATENT DOCUMENTS

2011/0220237 A1* 9/2011 Okamoto .................. B21C 1/22
  138/140
2013/0319569 A1* 12/2013 Kikuno ............... B23K 1/0012
  138/109

FOREIGN PATENT DOCUMENTS

CN           205781506 U  * 12/2016
DE             2020984 B2 *  8/1971  ............... B23K 1/20

\* cited by examiner

COPPER AND STEEL COMPOSITE PIPE, MANUFACTURING METHOD, APPLICATION AND WELDED STRUCTURE BODY

BACKGROUND OF THE INVENTION

Field of the Invention

This invention relates to the technical field of welding and, more particularly, relates to a novel copper and steel composite pipe, a manufacturing method, application, and a welded structure body.

Description of the Related Art

With development of society, national energy-saving and consumption-reducing policies are promoted continuously, in every industry, resources are continuously saved and energy consumption is continuously reduced, but in the refrigeration industry, a precious metal with good plasticity and strength, namely copper, has always been used as a main raw material for production and processing. In the development course of the industry in these years, many scientists performed research work on substitution of various materials. Thus, an extremely urgent event which is conductive to the industry and the national development is to find a material which has not only a certain strength, but also plasticity and processing performance.

In products in the field of refrigeration, the connection between copper pipes often needs to be used, and flame brazing is generally adopted as the connection way. For example, an existing gas outlet pipe on a liquid storage device of a compressor is connected with a gas suction pipe of a refrigeration compressor by adopting a copper elbow made of red copper, and then the elbow made of red copper needs to consume more copper materials only for the purpose of meeting convenience and quickness in welding of a pipeline system of an air conditioner. In order to reduce the consumption of copper resources and reduce the cost, we need to research and develop a composite novel material which can meet flame brazing and simultaneously save the consumption of the copper material.

In the practices of the industry, people have adopted a process of plating copper on the surface of a steel pipe to achieve the welding effect of copper and copper. However, when such product with copper plated on steel and the copper pipe are subjected to flame brazing, the phenomenon of shedding of a plated layer after burn-in exists, and the shed plated layer can cause the serious results of blockage of the pipeline system and jamming of the compressor when entering the pipeline system of the air conditioner. In addition, the way of plating copper on the steel product is not environment-friendly and liable to produce waste gas and waste water, so that the existing application of the process is greatly restricted.

In order to solve the above problems, Chinese patent application No. 2014106032792 discloses a welding method for copper and steel and application thereof, wherein a copper pipe and a steel pipe are butt connected and welded by argon arc welding, the copper pipe and a weld seam participate in pressure bearing and vibration work in an air conditioning system. Not only the strength requirement, but also the air tightness requirement needs to be met. In the long-term using process of the product, fatigue rupture of the weld seam is liable to occur, and the actual application of a copper-steel butt welded pipe is also greatly restricted.

BRIEF SUMMARY OF THE INVENTION

This invention provides a novel copper and steel composite pipe, a manufacturing method, application and a welded structure body for solving the problems that the existing welding effect of a copper pipe and a steel pipe is poor and the actual application is greatly limited.

In order to achieve the above objective, the invention provides a novel copper and steel composite pipe, comprising a steel pipe and a copper pipe. The steel pipe comprises a first end, a second end and a middle part. The copper pipe comprises a first end and a second end, wherein the length of the copper pipe is less than that of the steel pipe, the copper pipe is partially or totally sleeved on the steel pipe, when the copper pipe is partially sleeved on the steel pipe, the distance from an end surface of the first end of the copper pipe to an end surface of the first end of the steel pipe is less than 10 mm, and the second end of the copper pipe is positioned at the middle part of the steel pipe; when the copper pipe is totally sleeved on the steel pipe, both the first end and the second end of the copper pipe are positioned at the middle part of the steel pipe; and the copper pipe and the steel pipe are welded and connected in a way of melting base materials.

According to one embodiment of the invention, the copper pipe may be partially or totally sleeved outside the steel pipe, when the copper pipe is partially sleeved outside the steel pipe, the first end of the copper pipe and the first end of the steel pipe are welded and connected or the second end of the copper pipe and the middle part of the steel pipe are welded and connected; and when the copper pipe is totally sleeved outside the steel pipe, the first end of the copper pipe and the middle part of the steel pipe are welded and connected or the second end of the copper pipe and the middle part of the steel pipe are welded and connected.

According to one embodiment of the invention, the copper pipe may be partially or totally sleeved inside the steel pipe, when the copper pipe is partially sleeved inside the steel pipe, the first end of the copper pipe and the first end of the steel pipe are welded and connected; and when the copper pipe is totally sleeved inside the steel pipe, the first end of the copper pipe and the middle part of the steel pipe are welded and connected.

According to one embodiment of the invention, the cooper pipe may have a plurality of through slots or through holes in a sleeve joint region corresponding to the steel pipe, and the through slots or through holes are distributed along a circumferential direction of the copper pipe.

According to one embodiment of the invention, when the copper pipe and the steel pipe are welded and connected, a welding wire may be added, the copper pipe and the steel pipe may be fused mutually at a welded position for forming a liquid molten pool, and the welding wire may be molten in the liquid molten pool.

According to one embodiment of the invention, the steel pipe may be a carbon steel pipe or a stainless steel pipe.

In another aspect of the invention, a manufacturing method of a novel copper and steel composite pipe is further provided, comprising the following steps: assembling a copper pipe and a steel pipe, wherein the length of the copper pipe is less than that of the steel pipe, the copper pipe is partially or totally sleeved on the steel pipe, when the copper pipe is partially sleeved on the steel pipe, the distance from an end surface of the first end of the copper pipe to an end surface of the first end of the steel pipe is less than 10 mm, and the second end of the copper pipe is positioned at a middle part of the steel pipe; when the copper pipe is totally sleeved on the steel pipe, both the first end and the second end of the copper pipe are positioned at the middle part of the steel pipe; and welding and connecting the copper pipe and the steel pipe in a way of melting base materials.

According to one embodiment of the invention, the copper pipe may be welded and connected with the steel pipe by the welding technique selected from the group consisting of argon arc welding, plasma welding, quasi-plasma welding, laser welding, flash welding, resistance welding, and high-frequency welding.

According to one embodiment of the invention, when the copper pipe and the steel pipe are welded and connected, a center of a heating part may be shifted towards one side of the copper pipe by taking the end surface of the copper pipe as a reference surface, and a shift distance is 0.01 mm-1.5 mm.

According to one embodiment of the invention, when welding is performed, a gas shielding device may be arranged at a welded position for providing a shielding gas at the welded position.

In another aspect of the invention, a novel copper and steel composite pipe structure is applied to welding of a gas suction inner pipe, a gas suction outer pipe and an exhaust pipe of a refrigeration compressor, a gas inlet pipe of a liquid storage device or a gas outlet pipe of the liquid storage device of a compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, and a piping on an electronic expansion valve for the air conditioner.

In another aspect of the invention, a manufacturing method of a novel copper and steel composite pipe is applied to welding of a gas suction inner pipe, a gas suction outer pipe and an exhaust pipe of a refrigeration compressor, a gas inlet pipe of a liquid storage device or a gas outlet pipe of the liquid storage device of a compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, and a piping on an electronic expansion valve for the air conditioner.

In another aspect of the invention, a welded structure body is further provided, the welded structure body comprises two above-mentioned novel copper and steel composite pipes, wherein the copper pipe in one novel copper and steel composite pipe is partially or totally sleeved outside the steel pipe, the copper pipe in the other novel copper and steel composite pipe is partially or totally sleeved inside the steel pipe, the two novel copper and steel composite pipes are sleeved to enable the copper pipes in the two novel copper and steel composite pipes to correspond to each other, and the copper pipes in the two novel copper and steel composite pipes are welded and connected.

According to one embodiment of the invention, the welded structure body further comprises one above-mentioned novel copper and steel composite pipe and a steel component, wherein the novel copper and steel composite pipe and the steel component are sleeved, the steel component corresponds to the copper pipe in the novel copper and steel composite pipe, and the steel component and the copper pipe in the novel copper and steel composite pipe are welded and connected.

According to one embodiment of the invention, the welded structure body further comprises one above-mentioned novel copper and steel composite pipe and a copper component, wherein the novel copper and steel composite pipe and the copper component are sleeved, the copper component corresponds to the copper pipe in the novel copper and steel composite pipe, and the copper component and the copper pipe in the novel copper and steel composite pipe are welded and connected.

It can be known from the above technical solutions that in the embodiments of the invention, the copper pipe and the steel pipe are set to be partially or totally sleeved. Such structure is a composite component product taking the steel pipe as a main body, and the overall strength is much higher than the strength of a single copper pipe product per se. When the composite pipe and a copper connecting pipe on the pipeline of the air conditioner are subjected to flame brazing, because copper and copper or copper and steel are welded, it does not need to make any adjustment and modification to a welding process, and the equivalent switching can be completely realized. The steel pipe plays a role of improving welding conditions during welding, thereby achieving welding of copper and steel or welding of copper and copper with a mature welding process. Meanwhile, when the steel pipe and the copper pipe of the composite pipe are welded, the two welding base materials are fused mutually to form the liquid molten pool, and a weld beam is formed after cooling. As the general temperature of flame brazing is only below 800° C., which is much lower than the self-melting temperature of copper material (1083° C.), when the composite pipe is welded with other pipeline interfaces in an air conditioning system, the weld seam between copper and steel in the composite pipe cannot produce the leakage problem when being heated and molten by flame during flame brazing.

Further, the weld beam between copper and steel in the novel copper and steel composite pipe provided by the invention only plays a role of connecting copper and steel in the follow-up use, and the real requirements on welding strength and air tightness have been greatly reduced, so that the composite pipe is more reliable in the actual use and the substitutability is greatly increased.

These and other features, aspects, and advantages of the present invention will become better understood with regard to the following description, appended claims, and accompanying drawings.

DETAILED DESCRIPTION OF THE INVENTION

Embodiment 1

Figure 1:
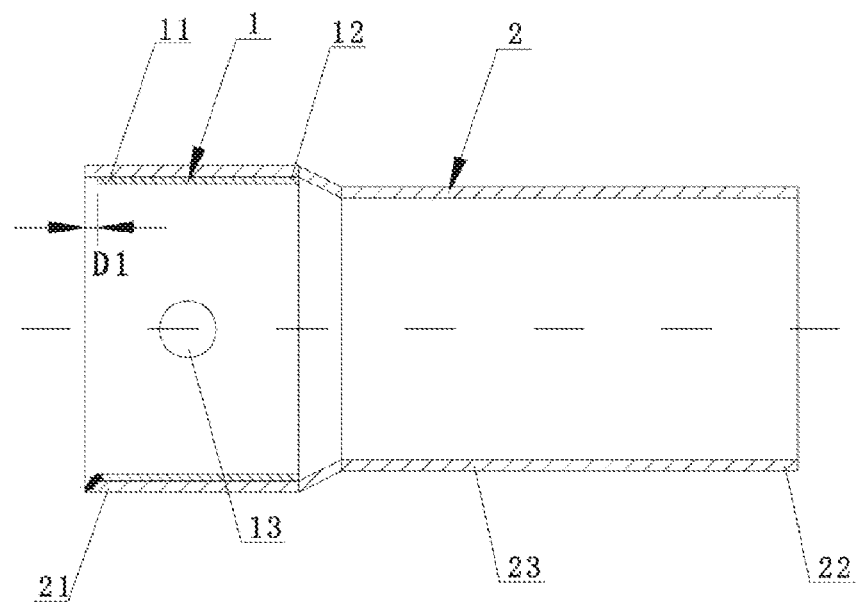
FIG. 1 is a structure schematic diagram showing a novel copper and steel composite pipe according to the first embodiment of this invention.
Figure 2:
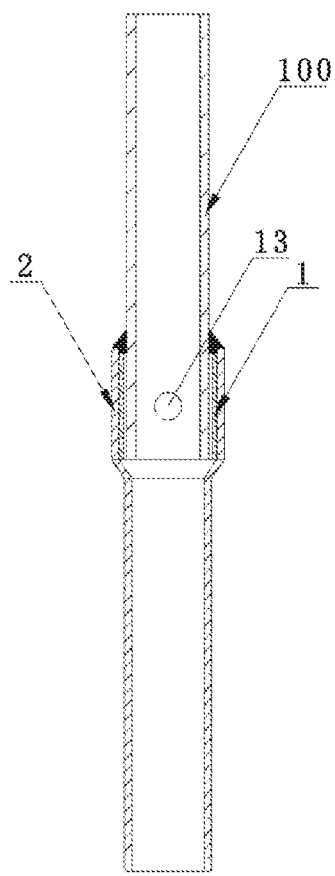
FIG. 2 is a connection schematic diagram between the novel copper and steel composite pipe as shown in FIG. 1 and a pipeline of an air conditioner.

As shown in FIG. 1, a novel copper and steel composite pipe provided by the embodiment comprises a copper pipe 1 and a steel pipe 2, and the steel pipe 2 comprises a first end 21, a second end 22 and a middle part 23. The copper pipe 1 comprises a first end 11 and a second end 12, wherein the length of the copper pipe 1 is less than that of the steel pipe 2, the copper pipe 1 is partially sleeved on the steel pipe 2, the distance D1 from an end surface of the first end 11 of the copper pipe to an end surface of the first end 21 of the steel pipe is less than 10 mm, the second end 12 of the copper pipe is positioned at the middle part 23 of the steel pipe, and the copper pipe 1 and the steel pipe 2 are welded and connected.

The steel pipe and the copper pipe provided by the invention are hollow pipe-like parts with certain wall thickness, and the cross section of each of the steel pipe and the copper pipe may be in the shape of a circular ring, an oval ring or other ring constituted by arc-shaped curves. The steel pipe may be a gas inlet pipe of a liquid storage device or a gas outlet pipe of the liquid storage device or other parts. The distance from the end surface of the first end 11 of the copper pipe to the end surface of the first end 21 of the steel pipe refers to the distance along the axial direction of the copper pipe. The middle part 23 of the steel pipe refers to the part between the first end 21 and the second end 22 of the steel pipe.

In the embodiment, the copper pipe 1 is lined in the first end 21 of the steel pipe, and the first end 11 of the copper pipe and the first end 21 of the steel pipe are welded and connected. Before welding, the end surface of the first end 11 of the copper pipe and the end surface of the first end 21 of the steel pipe are set to be flush. Through such setting, after welding, a weld seam completely coats the end surface of the first end 11 of the copper pipe and the end surface of the first end 21 of the steel pipe, thereby having a great welding effect. However, the invention is not limited thereto. In other embodiments, the distance from the end surface of the first end 11 of the copper pipe to the end surface of the first end 21 of the steel pipe can adopt other numerical values less than 10 mm.

In the embodiment, during welding, the first end 11 of the copper pipe and the first end 21 of the steel pipe are fused mutually to form a liquid molten pool, and the weld seam is formed after cooling to weld and connect the first end 11 of the copper pipe and the first end 21 of the steel pipe. The weld seam is a joint part formed after welding of the first end 11 of the copper pipe and the first end 21 of the steel pipe. However, the welding and connection way of the first end 11 of the copper pipe and the first end 21 of the steel pipe is not limited in the invention. In other embodiments, during welding, a welding wire can be added, the first end 11 of the copper pipe and the first end 21 of the steel pipe are fused mutually to form a liquid molten pool, and the melting wire is molten in the liquid molten pool. On the basis of melting the base materials, the welding wire is added for melting, so that a plumper weld seam can be obtained, and the weld seam also has greater connection strength.

The novel copper and steel composite pipe provided by the invention is a composite pipe taking the steel pipe as a main body, and the strength of the whole composite pipe is determined by the steel pipe 2 with relatively thick wall thickness. While the copper pipe 1 is only used for realizing welding of the same material when it is welded with a copper connecting pipe and other copper components on a pipeline of an air conditioner, thereby achieving the purposes of reducing welding difficulty and improving welding quality and not playing pressure-bearing and pressure-resisting roles. Thus, the copper pipe in the novel copper and steel composite pipe provided by the invention is a thin-walled copper pipe with the wall thickness less than 2 mm. Preferably, the wall thickness of the copper pipe 1 is set to be 0.4 mm. However, the invention is not limited thereto. By greatly reducing the wall thickness of the copper pipe, the using cost of copper material is greatly reduced. In addition, the sleeve joint structure of the copper pipe 1 and the steel pipe 2 ensures the rigid requirement of the composite pipe and avoids the fatigue fracture and other problems in the long-term use.

In order to further enhance the connection strength between the copper pipe 1 and the steel pipe 2, in the embodiment, in a sleeve joint region of the copper pipe 1 corresponding to the steel pipe 2, a plurality of through holes 13 are distributed along a circumferential direction of the copper pipe 1. However, the invention is not limited thereto. In other embodiments, a plurality of through slots is distributed along the circumferential direction of the copper pipe 1.

Through the through holes 13 distributed in the circumferential direction of the copper pipe in the sleeve joint region, when the novel copper and steel composite pipe provided by the invention and the copper part on the pipeline of the air conditioner are subjected to flame brazing, a welding flux permeates to the through holes 13 along a gap between the copper part and the copper pipe 1 and fill in the through holes 13. The welding flux in the through holes 13 further enhances the connection strength between the copper pipe and the steel pipe. Preferably, a plurality of through holes 13 are uniformly distributed in the axial direction of the copper pipe 1. However, the invention is not limited thereto.

In the embodiment, the steel pipe 2 is a stainless steel pipe. However, the invention is not limited thereto. In other embodiments, the steel pipe 2 can be a carbon steel pipe.

Figure 7:
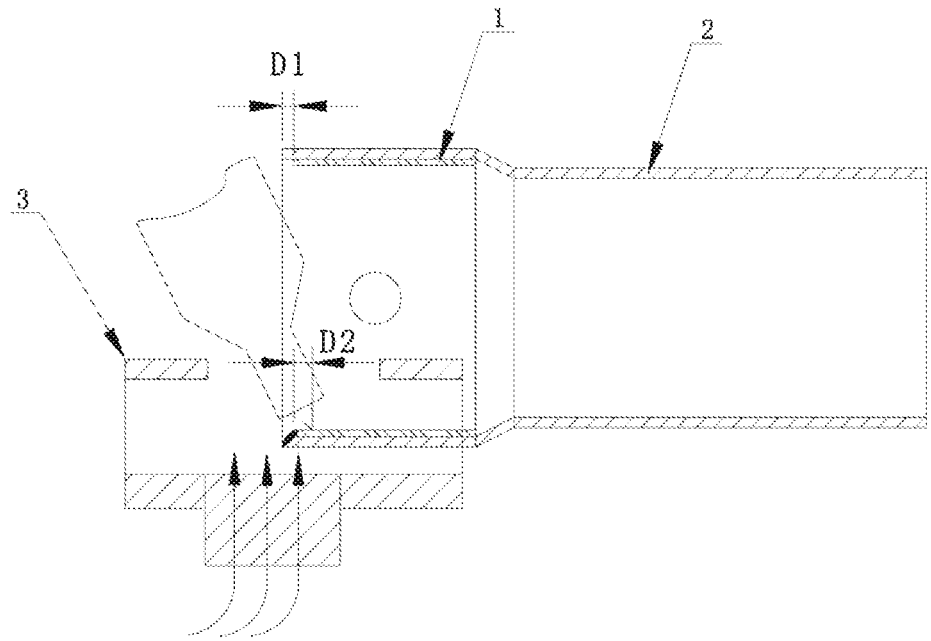
FIG. 7 is a structure schematic diagram showing the novel copper and steel composite pipe as shown in FIG. 1 during welding.

Correspondingly, the embodiment further provides a manufacturing method for manufacturing a novel copper and steel composite pipe (the structure diagram of welding is as shown in FIG. 7), comprising the following steps:

Firstly assembling two welding base materials, namely a copper pipe and a steel pipe, and lining the copper pipe 1 with the length less than that of the steel pipe in the steel pipe 2, wherein the distance D1 from the end surface of a first end 11 of the copper pipe to the end surface of a first end 21 of the steel pipe is less than 10 mm, and a second end 12 of the copper pipe is positioned at the middle part 23 of the steel pipe.

Welding and connecting the first end 11 of the copper pipe and the first end 21 of the steel pipe in a way of melting the base materials.

In the embodiment, the end surface of the first end 11 of the copper pipe and the end surface of the first end 21 of the steel pipe are set to be flush, namely the distance from the end surface of the first end 11 of the copper pipe to the end surface of the first end 21 of the steel pipe is zero. However, the invention is not limited thereto. In other embodiments, the distance from the end surface of the first end 11 of the copper pipe to the end surface of the first end 21 of the steel pipe can adopt other numerical values less than 10 mm.

In the embodiment, an argon arc welding way is adopted for welding and connecting the first end 11 of the copper pipe and the first end 21 of the steel pipe. However, the invention is not limited thereto. In other embodiments, any one of plasma welding, quasi-plasma welding, laser welding, flash welding, resistance welding and high-frequency welding is adopted for welding.

In actual welding, although the melting point of steel is higher than that of copper, the heat conduction rate of copper material is 6 times that of steel. In order to realize mutual fusion of the copper pipe and the steel pipe, during welding, the center of a heating part (a tungsten needle of a welding gun) is set to be shifted to one side of the copper pipe by taking the end surface of the copper pipe as a reference surface, and a shift distance D2 is 0.01 mm-1.5 mm. Preferably, the distance D2 is set to be 0.2 mm-0.3 mm. At this time, the diameter of grains formed after welding is very small, and the welding effect and the welding strength are great.

In order to avoid the production of gas holes in the weld seam in the welding process, in the embodiment, during argon arc welding, in addition to the heating part (the tungsten needle of the welding gun) being protected by an inert gas, a gas shielding device 3 for providing gas protection is also added at a welded position, thereby effectively isolating air or other gas and avoiding the production of the welding gas holes. In the embodiment, the shielding gas is an inert gas. However, the invention is not limited thereto.

The novel copper and steel composite pipe provided by the invention can be applied to a gas suction inner pipe, a gas suction outer pipe and an exhaust pipe of a refrigeration compressor, a gas inlet pipe of a liquid storage device or a gas outlet pipe of the liquid storage device of a compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, and a piping on an electronic expansion valve for the air conditioner.

Correspondingly, the manufacturing method of the copper and steel composite pipe is also applied to welding of a gas suction inner pipe, a gas suction outer pipe and an exhaust pipe of a refrigeration compressor, a gas inlet pipe of a liquid storage device or a gas outlet pipe of the liquid storage device of a compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, and a piping on an electronic expansion valve for the air conditioner.

Figure 3:
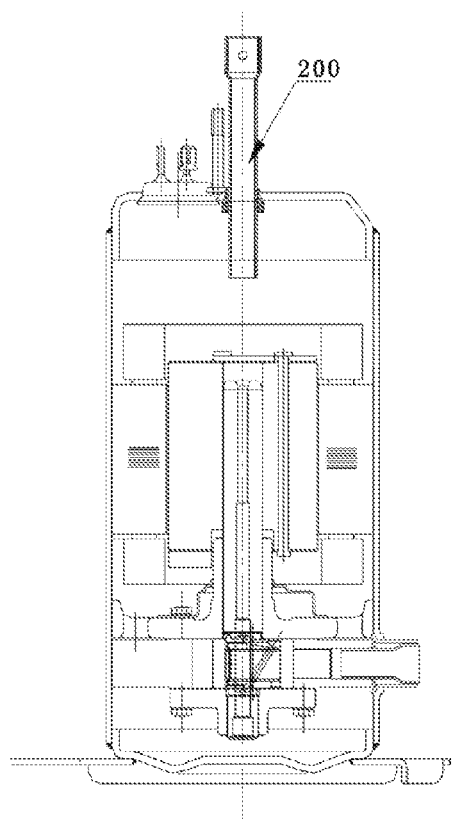
FIG. 3 is a structure schematic diagram showing the novel copper and steel composite pipe as shown in FIG. 1 is applied to an exhaust pipe of a refrigeration compressor.
Figure 4:
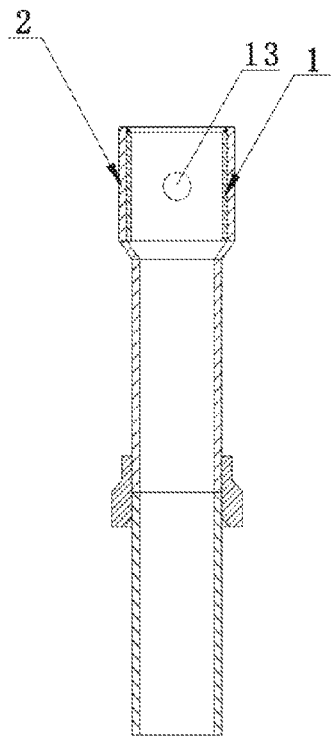
FIG. 4 is an enlarged schematic diagram of the exhaust pipe of the refrigeration compressor.
Figure 5:
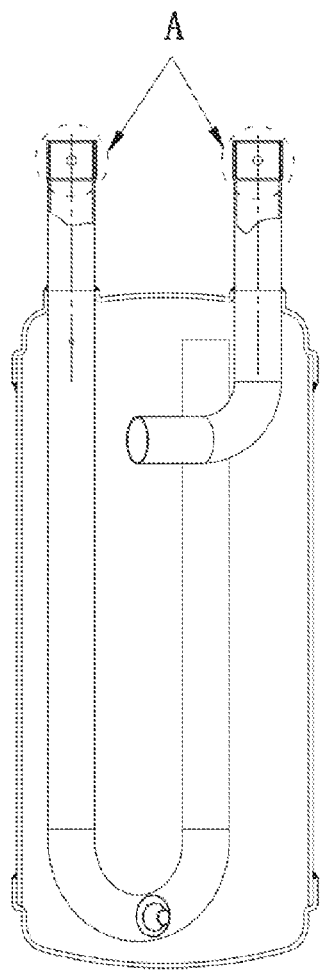
FIG. 5 is a structure schematic diagram showing the novel copper and steel composite pipe as shown in FIG. 1 is applied to a gas-liquid separator.
Figure 5A:
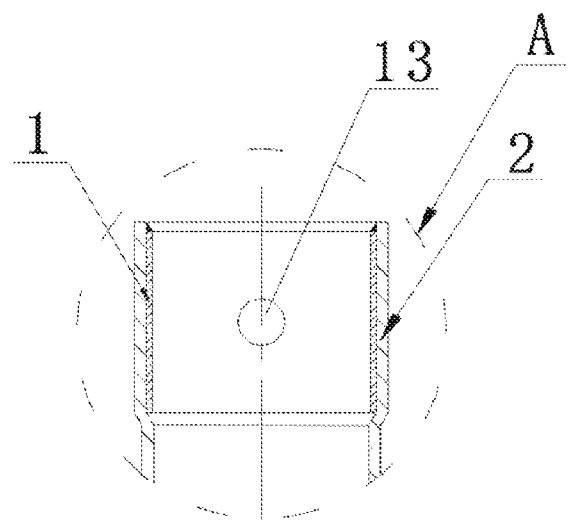
FIG. 5a is an enlarged schematic diagram of part A in FIG. 5.
Figure 6:
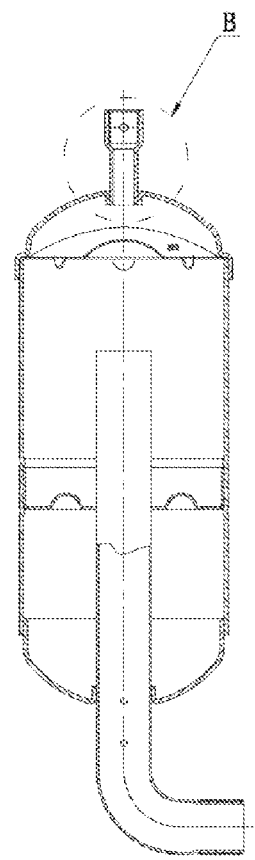
FIG. 6 is a structure schematic diagram showing the novel copper and steel composite pipe as shown in FIG. 1 is applied to a gas inlet pipe of a liquid storage device.
Figure 6B:
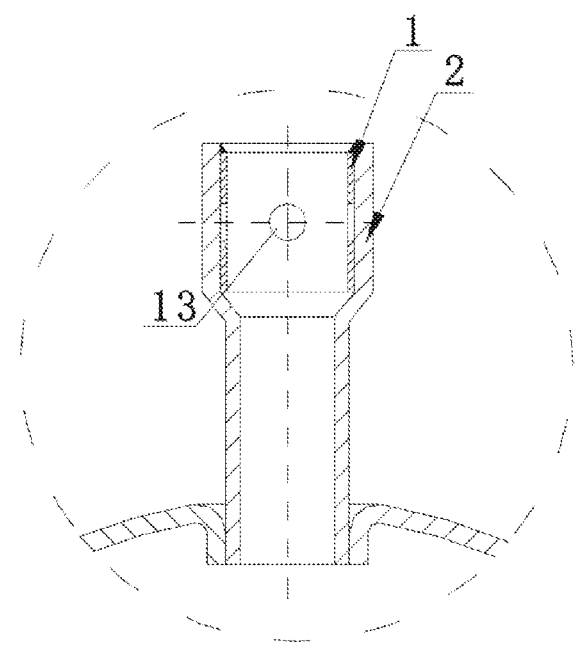
FIG. 6B is an enlarged schematic diagram of part B in FIG. 6.

The detailed description is made by taking FIG. 3 and FIG. 4 as an example.

In the field of air conditioners, the exhaust pipe of the refrigeration compressor needs to be welded with the copper component on the pipeline of the air conditioner. In order to realize the welding of the same metal, the traditional practice is that the copper pipe is arranged at the upper end of the exhaust pipe of the refrigeration compressor, the steel pipe is arranged at the lower end, a steel sleeve is arranged in the middle for connecting the two, and the connection way of the three is flame brazing. In such structure, a copper connecting pipe participates in work of an air conditioning system, so that the copper connecting pipe is required to have relatively high pressure tolerance and pressure-bearing capability. Thus, the pipe wall of the copper connecting pipe needs to be thicker, and the copper consumption is high. However, as copper is a precious metal, the cost of the exhaust pipe of the traditional refrigeration compressor is higher.

As shown in FIG. 3, when the novel copper and steel composite pipe provided by the invention is applied to the exhaust pipe of the refrigeration compressor, the upper end of the copper connecting pipe and the second end 22 of the steel pipe in the novel copper and steel composite pipe are subjected to butt joint welding, and the steel sleeve is added at the welded position, the welding of the steel connecting pipe, the second end 22 of the steel pipe in the novel copper and steel composite pipe and the steel sleeve are welding of the same metal, the welding process is very mature, for example, brazing is performed in a furnace once, and then the quality after welding is very good. By lining the copper pipe 1 in the first end 21 of the steel pipe, the copper pipe 1 only plays a connecting role to realize the welding of the same metal, does not participate as a main body in work of the air conditioning system (the steel pipe is used for bearing pressure and resisting pipe) and does not bear the pressure or bears very small pressure, so that the copper pipe can adopt the thin-walled copper pipe, such as the copper pipe with the wall thickness of 0.4 mm. As the wall thickness of the copper pipe is greatly reduced, the production cost of the exhaust pipe of the refrigeration compressor is greatly reduced.

It can be known from the above analysis that, according to the novel copper and steel composite pipe provided by the invention, the welding of the same metal is realized by adding the copper pipe 1, so that the welding quality is very high and meanwhile, the production cost of the product can be greatly reduced. Furthermore, the novel copper and steel composite pipe provided by the invention is bound to be well popularized and applied.

Embodiment 2

Figure 8:
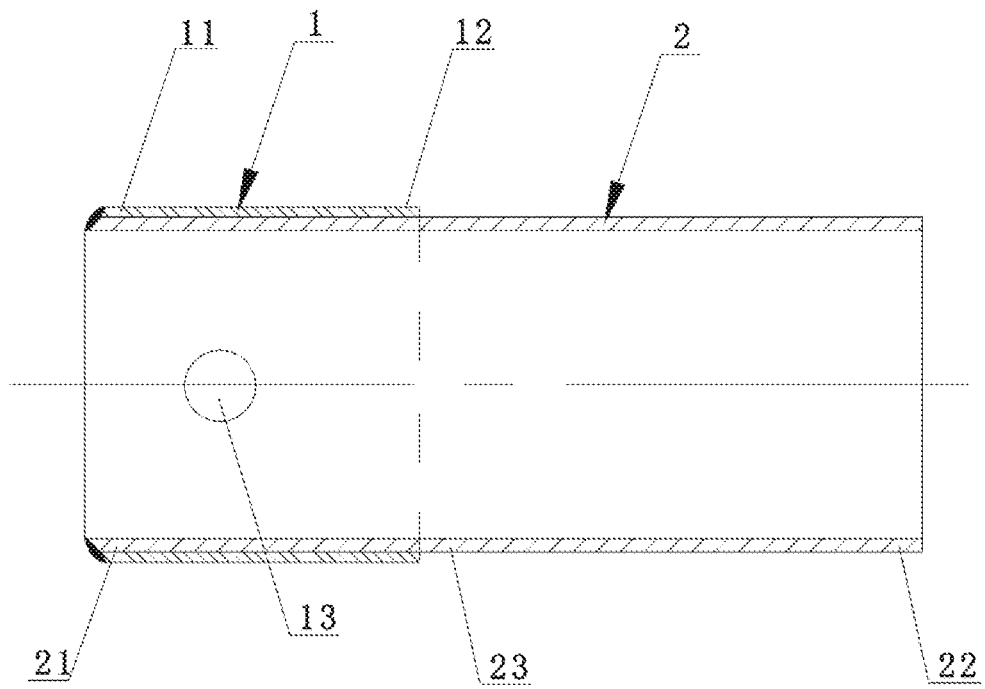
FIG. 8 is a structure schematic diagram of a novel copper and steel composite pipe according to the second embodiment of the invention.
Figure 9:
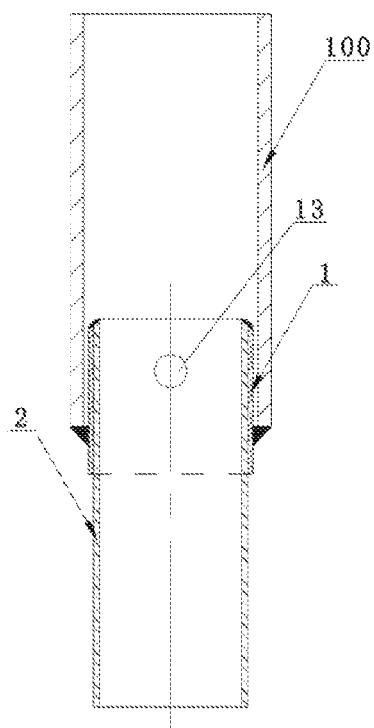
FIG. 9 is a connection schematic diagram between the novel copper and steel composite pipe as shown in FIG. 8 and a pipeline of an air conditioner.
Figure 10:
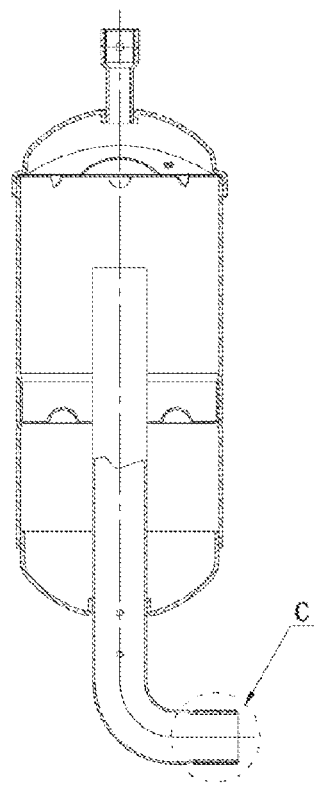
FIG. 10 is a structure schematic diagram showing the novel copper and steel composite pipe as shown in FIG. 8 is applied to a gas outlet pipe of a liquid storage device of a compressor.
Figure 10A:
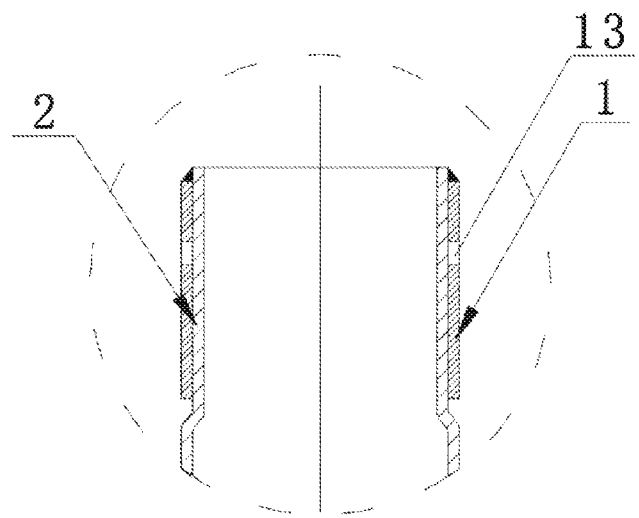
FIG. 10a is an enlarged schematic diagram of part C in FIG. 10.

Please refer to FIG. 8 to FIG. 10 together.

The embodiment is basically the same as the first embodiment, and the difference lies in that: the copper pipe 1 and the steel pipe 2 are sleeved in such a way that the copper pipe 1 is partially sleeved outside the steel pipe 2. The first end 12 of the copper pipe and the first end 23 of the steel pipe are welded and connected or the second end 12 of the copper pipe and the middle part 23 of the steel pipe are welded and connected.

In the embodiment, the first end 11 of the copper pipe and the first end 21 of the steel pipe are welded and connected, and before welding, the first end 11 of the copper pipe and the first end 21 of the steel pipe are set to be flush. However, the invention is not limited thereto. In other embodiments, only the second end 12 of the copper pipe and the middle part 23 of the steel pipe are welded and connected, or in order to realize higher connection strength, the first end 11 of the copper pipe and the first end 21 of the steel pipe, as well as the second end 12 of the copper pipe and the middle part 23 of the steel pipe can be welded and connected. In other embodiments, before welding, the distance D1 from the end surface of the first end 11 of the copper pipe to the end surface of the first end 21 of the steel pipe can adopt other numerical values less than 10 mm.

The novel copper and steel composite pipe provided by the embodiment is applied to the gas outlet pipe of the liquid storage device of the compressor. However, the invention is not limited thereto. In other embodiments, the novel copper and steel composite pipe and the manufacturing method thereof provided by the invention can be applied to a gas suction inner pipe, a gas suction outer pipe and an exhaust pipe of a refrigeration compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, a piping on an electronic expansion valve for the air conditioner and other parts.

Embodiment 3

Figure 11:
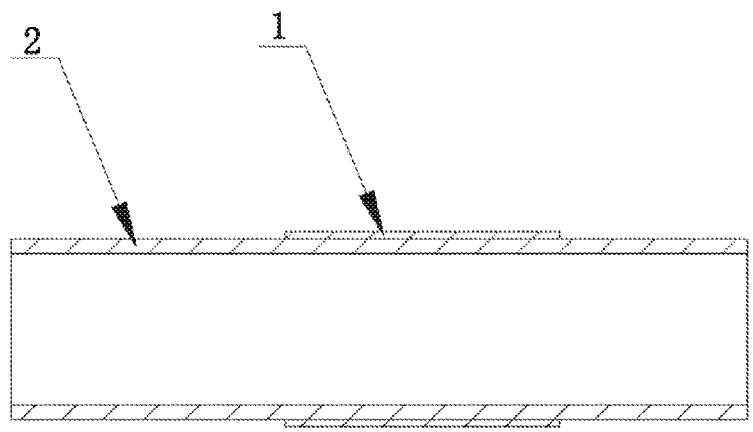
FIG. 11 is a structure schematic diagram showing a novel copper and steel composite pipe according to the third embodiment of the invention.

The embodiment is basically the same as the first embodiment, and the difference lies in that: the copper pipe 1 is totally sleeved outside the steel pipe 2. As shown in FIG. 11, both the first end 11 and the second end 12 of the copper pipe are positioned at the middle part of the steel pipe 2, and the copper pipe 1 and the steel pipe 2 are welded and connected in a way of melting base materials. Specifically, the first end 11 of the copper pipe and the middle part of the steel pipe 2 are welded and connected, and the second end 12 of the copper pipe and the middle part of the steel pipe 2 are welded and connected.

Figure 11A:
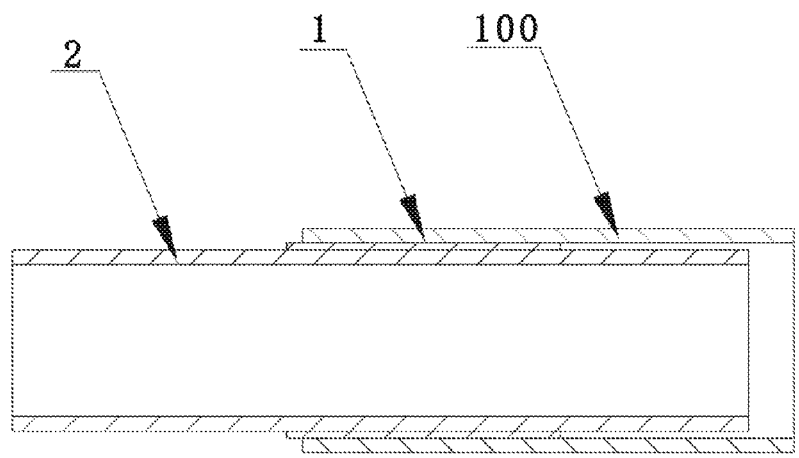
FIG. 11a is a structure schematic diagram showing a welded structure body formed by the novel copper and steel composite pipe as shown in FIG. 11 and a copper component.

FIG. 11a is a structure schematic diagram showing a welded structure body formed by the novel copper and steel composite pipe as shown in FIG. 11 and a copper component 100. The copper component 100 is sleeved outside the novel copper and steel composite pipe and corresponds to the copper pipe 1 of the novel copper and steel composite pipe, and the novel copper component 100 and the copper pipe 1 of the novel copper and steel composite pipe are welded and connected, thereby realizing welding of copper and copper.

Figure 11B:
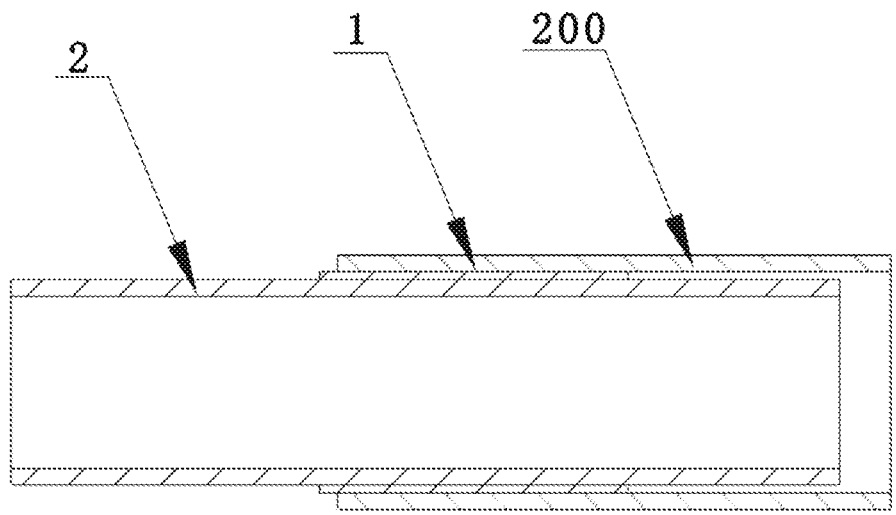
FIG. 11b is a structure schematic diagram showing a welded structure body formed by the novel copper and steel composite pipe as shown in FIG. 11 and a steel component.

FIG. 11b is a structure schematic diagram showing a welded structure body formed by the novel copper and steel composite pipe as shown in FIG. 11 and a steel component 200. The steel component 200 is sleeved outside the novel copper and steel composite pipe and corresponds to the copper pipe 1 of the novel copper and steel composite pipe, and the novel steel component 200 and the copper pipe 1 of the novel copper and steel composite pipe are welded and connected, thereby realizing welding of copper and steel.

Figure 11C:
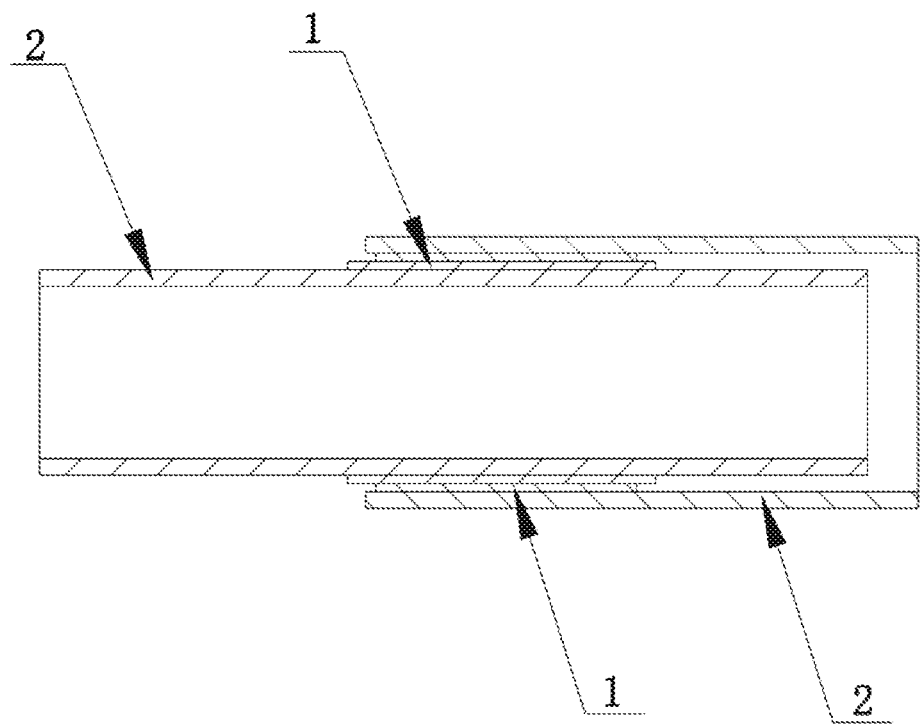
FIG. 11c is a structure schematic diagram showing a welded structure body formed by the novel copper and steel composite pipe as shown in FIG. 11 and the other novel copper and steel composite pipe.

FIG. 11c is a structure schematic diagram showing a welded structure body formed by the novel copper and steel composite pipe as shown in FIG. 11 and the other novel copper and steel composite pipe (such as the novel copper and steel composite pipe of which the copper pipe is partially sleeved inside the steel pipe, as shown in FIG. 1). The copper pipes in the two novel copper and steel composite pipes correspond to each other and are welded and connected, thereby realizing welding of copper and copper.

Figure 12:
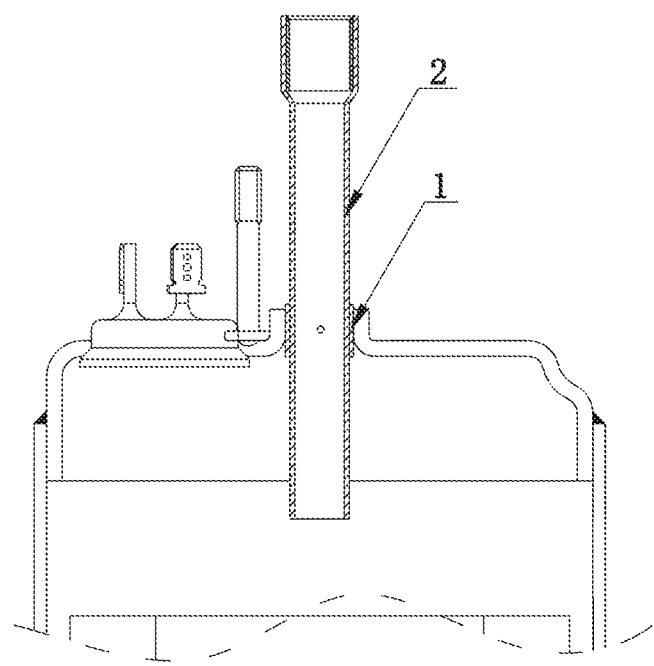
FIG. 12 is a structure schematic diagram showing the novel copper and steel composite pipe as shown in FIG. 11 is applied to an exhaust pipe of a refrigeration compressor.

FIG. 12 is a structure schematic diagram showing the novel copper and steel composite pipe as shown in FIG. 11 is applied to an exhaust pipe of a refrigeration compressor.

It can be known from the above technical solution that, in the embodiment, the copper pipe 1 and the steel pipe 2 are set to be sleeved and the distance from the end surface of the first end 11 of the copper pipe to the end surface of the first end 21 of the steel pipe is less than 10 mm. Such structure is a composite component product taking the steel pipe as a main body, and the overall strength is much higher than the strength of a single copper pipe product per se. The steel pipe 1 plays a role of improving welding conditions during welding, thereby achieving welding of copper and steel or welding of copper and copper with a mature welding process. When the composite pipe and a copper connecting pipe on the pipeline of the air conditioner are subjected to flame brazing, because copper and copper are welded, it does not need to be made any adjustment and modification to a welding process, and the equivalent switching can be completely realized. Meanwhile, when the steel pipe and the copper pipe of the composite pipe are welded, the two welding base materials are fused mutually to form the liquid molten pool, and a weld beam is formed after cooling. As the general temperature of flame brazing is only below 800° C., which is much lower than the self-melting temperature of copper material (1083° C.), when the composite pipe is welded with other pipeline interfaces in an air conditioning system, the weld seam between copper and steel in the composite pipe cannot produce the leakage problem when being heated and molten by flame during flame brazing.

Further, the weld beam between copper and steel in the novel copper and steel composite pipe provided by the invention only plays a role of connecting copper and steel in the follow-up use, and the real requirements on welding strength and air tightness have been greatly reduced, so that the composite pipe is more reliable in actual use and the substitutability is greatly increased.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A novel copper and steel composite pipe, comprising:
   a steel pipe comprising a first end, a second end, and a middle part; and
   a copper pipe comprising a first end and a second end, wherein the length of the copper pipe is less than that of the steel pipe, the copper pipe is partially or totally sleeved on the steel pipe, when the copper pipe is partially sleeved on the steel pipe, the distance from an end surface of the first end of the copper pipe to an end surface of the first end of the steel pipe is less than 10 mm, and the second end of the copper pipe is positioned at the middle part of the steel pipe; when the copper pipe is totally sleeved on the steel pipe, both the first end and the second end of the copper pipe are positioned at the middle part of the steel pipe; and the copper pipe and the steel pipe are welded and connected in a way of melting base materials, wherein the cooper pipe has a plurality of through slots or through holes in a sleeve joint region corresponding to the steel pipe, and the through slots or through holes are distributed along a circumferential direction of the copper pipe.

2. The novel copper and steel composite pipe according to claim 1, wherein the copper pipe is partially or totally sleeved outside the steel pipe, when the copper pipe is partially sleeved outside the steel pipe, the first end of the copper pipe and the first end of the steel pipe are welded and connected or the second end of the copper pipe and the middle part of the steel pipe are welded and connected; and when the copper pipe is totally sleeved outside the steel pipe, the first end of the copper pipe and the middle part of the steel pipe are welded and connected or the second end of the copper pipe and the middle part of the steel pipe are welded and connected.

3. The novel copper and steel composite pipe according to claim 1, wherein the copper pipe is partially or totally sleeved inside the steel pipe, when the copper pipe is partially sleeved inside the steel pipe, the first end of the copper pipe and the first end of the steel pipe are welded and connected; and when the copper pipe is totally sleeved inside the steel pipe, the first end of the copper pipe and the middle part of the steel pipe are welded and connected.

4. The novel copper and steel composite pipe according to claim 1, wherein when the copper pipe and the steel pipe are welded and connected, a welding wire is added, the copperpipe and the steel pipe are fused mutually at a welded position for forming a liquid molten pool, and the welding wire is molten in the liquid molten pool.

5. The novel copper and steel composite pipe according to claim 1, wherein the steel pipe is a carbon steel pipe or a stainless steel pipe.

6. Application of a novel copper and steel composite pipe according claim 1, wherein the novel copper and steel composite pipe is applied to welding of a gas suction inner pipe, a gas suction outer pipe, an exhaust pipe of a refrigeration compressor, a gas inlet pipe of a liquid storage device or a gas outlet pipe of the liquid storage device of a compressor, a piping on a silencer for an air conditioner, a piping for a gas-liquid separator or an oil-gas separator, a piping of a stop valve for the air conditioner, a piping of the air conditioner, a pipeline piece, a connecting pipe, a piping on an electromagnetic four-way reversing valve for the air conditioner, and a piping on an electronic expansion valve for the air conditioner.

7. A welded structure body, comprising two novel copper and steel composite pipes, each of the novel copper and steel composite pipe, comprising:
 a steel pipe comprising a first end, a second end, and a middle part; and
 a copper pipe comprising a first end and a second end, wherein the length of the copper pipe is less than that of the steel pipe, the copper pipe is partially or totally sleeved on the steel pipe, when the copper pipe is partially sleeved on the steel pipe, the distance from an end surface of the first end of the copper pipe to an end surface of the first end of the steel pipe is less than 10 mm, and the second end of the copper pipe is positioned at the middle part of the steel pipe; when the copper pipe is totally sleeved on the steel pipe, both the first end and the second end of the copper pipe are positioned at the middle part of the steel pipe; and the copper pipe and the steel pipe are welded and connected in a way of melting base materials, wherein the copper pipe in one novel copper and steel composite pipe is partially or totally sleeved outside the steel pipe, the copper pipe in the other novel copper and steel composite pipe is partially or totally sleeved inside the steel pipe, the two novel copper and steel composite pipes are sleeved to enable the copper pipes in the two novel copper and steel composite pipes to correspond to each other, and the copper pipes in the two novel copper and steel composite pipes are welded and connected.

8. A welded structure body, comprising the novel copper and steel composite pipe according to claim 1 and a steel component, wherein the novel copper and steel composite pipe and the steel component are sleeved, the steel component corresponds to the copper pipe in the novel copper and steel composite pipe, and the steel component and the copper pipe in the novel copper and steel composite pipe are welded and connected.

9. A welded structure body, comprising the novel copper and steel composite pipe according to claim 1 and a copper component, wherein the novel copper and steel composite pipe and the copper component are sleeved, the copper component corresponds to the copper pipe in the novel copper and steel composite pipe, and the copper component and the copper pipe in the novel copper and steel composite pipe are welded and connected.

\* \* \* \* \*